3,155,491
BRAZING ALLOY
George Sidney Hoppin III, Huntington Woods, Mich., and William R. Young, Cincinnati, Ohio, assignors to General Electric Company, a corporation of New York
No Drawing. Filed Dec. 26, 1961, Ser. No. 162,193
5 Claims. (Cl. 75—.5)

This invention relates to nickel base brazing alloys and, in particular, to a mixture of nickel base brazing alloy powders having improved brazing and remelt characteristics.

Various blends of powdered brazing alloys and powdered high melting constituents are presently used for wide-gap brazing, low erosion brazing and the like. The wide-gap brazing alloys are those having one component which melts at the brazing temperature and another component which either does not melt or only partially melts at the brazing temperature in order to form a skeleton or bridge between members to be joined. Through the use of such alloys, close tolerances previously required between articles to be joined are no longer mandatory. During brazing the skeleton or bridging component closes the gap between the articles and the component which completely melts flows in and around the bridging component to close the gap.

However, as technology such as in the gas turbine art has advanced, the operating temperature of apparatus has increased beyond the remelt temperature of known wide-gap powder blends. While it is possible to mix a variety of materials of the wide-gap brazing alloy type to advance the remelt temperature beyond the operating temperature of the apparatus, nevertheless a serious consideration must be production application of the brazing alloy. Most commercial brazing furnaces, without modification, cannot operate at the higher temperatures required to braze known higher remelt alloys suitable for brazing advanced components, whether or not the wide-gap variety is required. The purchase of new equipment to replace operative furnaces would not be economical for most operations. Furthermore, higher brazing temperatures to achieve higher remelt temperatures could cause deterioration of the properties of many of the materials being joined.

Therefore, it is a principal object of this invention to provide an improved brazing alloy mixture which has a relatively high remelt temperature but which has a brazing temperature within the normal operating temperatures of present commercial furnaces.

Another object of this invention is to provide such an alloy mixture having wide-gap brazing characteristics.

Still a further object is to provide such an alloy mixture having good capillary flow characteristics.

These and other objects and advantages will be recognized from the following detailed description and examples which are exemplary of rather than limitations on the scope of the present invention.

Briefly, the alloy mixture of this invention consists of a mixture of 10–40 weight percent of a powdered alloy consisting, by weight, essentially of 1.5–2.4% Si, 0.5–1.8% B with the balance nickel (hereinafter referred to as NSB); and 60–90 weight percent of a powdered alloy consisting, by weight, essentially of, 18–20% Cr, 9.5–10.5% Si with the balance essentially nickel (hereinafter referred to as CSN).

It was recognized that the mixture of powders of this invention has physical properties unlike either of its two powdered alloy constituents. For example the brazing temperature of the major component of the mixture, CSN, is lowered from about 2220° F. to the 2100–2150° F. range while the reflow temperature of the 60% CSN–40% NSB mixture was greater than about 2200° F. in air. The mixture of this invention thus provides an alloy mixture which can be brazed in the 2100–2150° F. range of commercial facilities and yet has an improved reflow temperature in excess of about 2200° F. The 30–40% NSB mixture, balance CSN, is particularly useful as a wide-gap brazing alloy; the 10–30% NSB—balance CSN mixture is particularly useful as a capillary flow type brazing alloy mixture.

In order to determine the characteristics of the mixture of the present invention, brazing alloy mixtures containing 10, 20, 30, 40 and 45 weight percent powdered NSB alloy af about −200 mesh were mixed with the balance powdered CSN alloy of about −200 mesh size.

T joints were prepared from 0.063 inch sheet material having a nominal composition, by weight, of 1% Mn, 20% Cr, 10% Ni, 15% W with the balance Co. Shim material was used to produce a uniform 0.060 inch gap which was maintained by tack welding the ends. Specimens were cleaned by wet blasting prior to brazing.

The brazing mixtures were blended in a double cone rotary blender and slurries of these mixtures were made with a standard commercial brazing cement of the arcylic resin solution type. The slurries were applied to the T joints with a spatula and the T joints were then brazed in dry hydrogen at 2150° F. for about 10 minutes. All of the brazing mixture except the 45% by weight NSB mixture brazed well at this temperature with the 10% and 20% by weight NSB mixtures showing slightly better fillets because of their better flow characteristics at that temperature. The 45% NSB mixture showed no flow even after it was tested at 2200° F.

The specimens were tested for remelt temperatures by heating the T joints in a vertical position in an air atmosphere. The specimens were held for 30 minutes at 50° F. intervals between 2050 and 2250° F. Remelt was observed at 2250° F. but no remelting occurred at the lower temperatures.

It was observed that the 10 and 20 weight percent NSB brazing mixture had excellent capillary flow characteristics but were too fluid for wide-gap brazing. The mixtures within the 30–40 weight percent NSB range produced sound wide-gap joints under brazing conditions at 2150° F.

Although the present invention has been described in connection with specific examples, it will be recognized by those skilled in the art the modification and variations of which the invention is capable within the scope of the appended claims.

What is claimed is:

1. An improved brazing alloy mixture consisting of a mixture of:
    10–40 weight percent of a powdered alloy consisting, by weight, essentially of 1.5–2.4% Si, 0.5–1.8% B with the balance nickel; and
    60–90 weight percent of a powdered alloy consisting, by weight, essentially of 18–20% Cr, 9.5–10.5% Si with the balance nickel.
2. An improved brazing alloy mixture particularly useful as a wide-gap brazing alloy mixture consisting of:
    30–40 weight percent of a powdered alloy consisting, by weight, essentially of 1.5–2.4% Si, 0.5–1.8% B with the balance nickel; and
    60–70 weight percent of a powdered alloy consisting, by weight, essentially of 18–20% Cr, 9.5–10.5% Si with the balance nickel.
3. An improved brazing alloy mixture, particularly useful as a wide-gap brazing alloy mixture consisting of:
    40 weight percent of a powdered alloy consisting, by weight, essentially of 1.5–2.4% Si, 0.5–1.8% B with the balance nickel; and 60 weight percent of a powdered alloy consisting, by weight, essentially of 18–20% Cr, 9.5–10.5% Si with the balance nickel.

4. An improved brazing alloy mixture particularly useful as a capillary flow alloy mixture consisting of:
- 10–20 weight percent of a powdered alloy consisting, by weight, essentially of 1.5–2.4% Si, 0.5–1.8% B with the balance nickel; and
- 80–90 weight percent of a powdered alloy consisting, by weight, essentially of 18–20% Cr, 9.5–10.5% Si with the balance nickel.

5. An improved brazing alloy mixture particularly useful as a capillary flow alloy mixture consisting of:
- 10 weight percent of a powdered alloy consisting, by weight, essentially of 1.5–2.4% Si, 0.5–1.8% B with the balance nickel; and
- 90 weight percent of a powdered alloy consisting, by weight, essentially of 18–20% Cr, 9.5–10.5% Si with the balance nickel.

References Cited in the file of this patent

UNITED STATES PATENTS

| | | |
|---|---|---|
| 2,714,760 | Boam et al. | Aug. 9, 1955 |
| 2,864,696 | Foreman | Dec. 16, 1958 |
| 2,868,667 | Bowles | Jan. 3, 1959 |
| 2,936,229 | Shepard | May 10, 1960 |